(12) United States Patent
Wankhade

(10) Patent No.: US 8,341,370 B2
(45) Date of Patent: Dec. 25, 2012

(54) RESTRICTING ACCESS TO OBJECT BASED STORAGE

(75) Inventor: Shriram Wankhade, Pune (IN)

(73) Assignee: Symantec Corporation, Mountain View, CA (US)

( * ) Notice: Subject to any disclaimer, the term of this patent is extended or adjusted under 35 U.S.C. 154(b) by 517 days.

(21) Appl. No.: 12/619,495

(22) Filed: Nov. 16, 2009

(65) Prior Publication Data

US 2011/0119460 A1     May 19, 2011

(51) Int. Cl.
*G06F 12/00* (2006.01)
(52) U.S. Cl. ......... 711/164; 711/152; 711/163; 711/173
(58) Field of Classification Search ........................ None
See application file for complete search history.

(56) References Cited

U.S. PATENT DOCUMENTS

| | | | |
|---|---|---|---|
| 6,014,669 | A | 1/2000 | Slaughter et al. |
| 7,149,858 | B1 | 12/2006 | Kiselev |
| 7,188,128 | B1 | 3/2007 | Nagaraj et al. |
| 7,194,487 | B1 | 3/2007 | Kekre et al. |
| 7,254,682 | B1 | 8/2007 | Arbon |
| 7,266,652 | B1 | 9/2007 | Hotle et al. |
| 7,373,520 | B1 | 5/2008 | Borthakur et al. |
| 7,565,419 | B1 | 7/2009 | Kwiatkowski et al. |
| 7,774,444 | B1 | 8/2010 | George et al. |
| 7,797,357 | B1 | 9/2010 | Nagaraj et al. |
| 7,886,119 | B1 | 2/2011 | Cameron et al. |
| 7,917,855 | B1 | 3/2011 | Satish et al. |
| 2006/0123211 | A1 | 6/2006 | Derk et al. |
| 2006/0206677 | A1 | 9/2006 | Kim et al. |
| 2007/0006018 | A1 | 1/2007 | Thompson et al. |
| 2007/0033356 | A1 | 2/2007 | Erlikhman |
| 2008/0104360 | A1 | 5/2008 | Takeuchi et al. |
| 2009/0187704 | A1* | 7/2009 | Rodgers ........................ 711/105 |
| 2010/0030959 | A1 | 2/2010 | Satoyama et al. |

OTHER PUBLICATIONS

Non-Final Office Action Mail Date Dec. 20, 2011; U.S. Appl. No. 12/608,892.
Final Office Action Mail Date May 16, 2012; U.S. Appl. No. 12/608,892.
Non-Final Office Action Mail Date Mar. 28, 2012; U.S. Appl. No. 12/697,074.
Non-Final Office Action Mail Date Dec. 1, 2011; U.S. Appl. No. 12/700,664.
Final Office Action Mail Date Jun. 12, 2012; U.S. Appl. No. 12/700,664.
Non-Final Office Action Mail Date Apr. 24, 2012; U.S. Appl. No. 12/827,911.
Symantec Corporation, "Veritas™ Volume Replicator Administrator's Guide, Solaris, 5.0 Maintenance Pack 3", 2008, Symantec Corporation, Cupertino, California, USA.
Symantec Corporation, "Veritas™ Volume Manager Administrators Guide, Solaris, 5.0 Maintenance Pack 3", 2008, Symantec Corporation, Cupertino, California, USA.

* cited by examiner

*Primary Examiner* — Shawn X Gu
(74) *Attorney, Agent, or Firm* — Wilmer Cutler Pickering Hale and Dorr LLP

(57) ABSTRACT

A method, in one embodiment, can include a server receiving a message to deactivate a partition key of an object based storage system. A token of the object based storage system is signed by the partition key. The object based storage system includes the server. Additionally, after receiving the message, the server can deactivate the partition key to block access to a partition of the object based storage system by a client. The server includes the partition.

20 Claims, 8 Drawing Sheets

RESTRICTING ACCESS TO OBJECT BASED STORAGE

BACKGROUND

Snapshots are used to record and preserve the state of an electronic storage device or system (e.g., a database) at any given moment. It is noted that a snapshot can be a read only image of an electronic file system at some point in time. Furthermore, snapshots of partitions of an Object Storage Device (OSD) are typically writeable by default. However, a read only snapshot can be implemented by ensuring that a write capability is not issued for partitions which are part of a read only snapshot. Within an Object Storage Device, note that a snapshot operation needs to stop client modifications to an Object Storage Device partition while taking a snapshot. A conventional way to stop client modifications involves changing a partition key of client tokens or capabilities.

Specifically, all object storage device clients need a token or capability to access the Object Storage Device. In addition, this token or capability must be signed by a partition key. It is pointed out that if a partition key is changed, then all issued tokens or capabilities associated with that partition key become invalid and hence cannot be used by a client to subsequently access the Object Storage Device. This mechanism is the preferred conventional way for blocking or restricting client access to an Object Storage Device partition during the snapshot operation.

However, there are disadvantages associated with this preferred conventional way. For example, once the snapshot operation is over or has been completed, all clients of the Object Storage Device need to acquire new tokens or capabilities from a meta-data server in order to continue to access the Object Storage Device. Unfortunately, this request for new tokens or capabilities from all the clients can end up putting a large amount of load onto the meta-data server and can also result in delaying even more the ability of the clients to access the Object Storage Device.

SUMMARY

A method, in one embodiment, can include a server receiving a message to deactivate a partition key of an object based storage system. A token of the object based storage system is signed by the partition key. The object based storage system includes the server. Additionally, after receiving the message, the server can deactivate the partition key to block access to a partition of the object based storage system by a client. The server includes the partition. In one embodiment, the method further includes re-activating the partition key to allow access to the partition of the object based storage system by the client. In an embodiment, the method further includes the server receiving a message to re-activate the partition key; and re-activating the partition key to allow access to the partition of the object based storage system by the client. In an embodiment, the partition is an Object Storage Device partition. In accordance with one embodiment, after the deactivating, the method can include the server receiving the token and sending a message instructing to re-submit the token. In an embodiment, the message further includes instructing to re-submit the token after a defined period of time. In one embodiment, the token is a security token.

In another embodiment, a computer readable storage medium has stored thereon, computer-executable instructions that when executed by a computing device cause the computing device to perform a method. The method includes receiving a message to deactivate a partition key of an object based storage system. A token of the object based storage system is signed by the partition key. The object based storage system includes the computing device. Furthermore, after receiving the message, the partition key is deactivated to block access to a partition of the object based storage system by a client. The computing device includes the partition. In one embodiment, the method further includes re-activating the partition key to allow access to the partition of the object based storage system by the client. In an embodiment, the method further includes receiving a message to re-activate the partition key; and re-activating the partition key to allow access to the partition of the object based storage system by the client. In an embodiment, the partition is an Object Storage Device partition. In accordance with one embodiment, after the deactivating, the method can include receiving the token and sending a message instructing to re-submit the token. In an embodiment, the message further includes instructing to re-submit the token after a defined period of time. In one embodiment, the token is a security token.

In yet another embodiment, a computer system includes a processor and computer readable storage media coupled to the processor and having stored therein instructions that, if executed by the computer system cause the computer system to execute a method. The method includes receiving a message to deactivate a partition key of an object based storage system. A token of the object based storage system is signed by the partition key. The object based storage system includes the computing system. In addition, after receiving the message, the partition key is deactivated to block access to a partition of the object based storage system by a client. The computing device includes the partition. In one embodiment, the method further includes re-activating the partition key to allow access to the partition of the object based storage system by the client. In an embodiment, the method further includes receiving a message to re-activate the partition key; and re-activating the partition key to allow access to the partition of the object based storage system by the client. In an embodiment, the partition is an Object Storage Device partition. In accordance with one embodiment, after the deactivating, the method can include receiving the token and sending a message instructing to re-submit the token. In an embodiment, the message further includes instructing to re-submit the token after a defined period of time.

While particular embodiments in accordance with the invention have been specifically described within this Summary, it is noted that the invention and the claimed subject matter are not limited in any way by these embodiments.

BRIEF DESCRIPTION OF THE DRAWINGS

The accompanying drawings, which are incorporated in and form a part of this specification and in which like numerals depict like elements, are included for exemplary illustration of principles of the present embodiments and are not intended to limit the invention to the particular implementations illustrated therein. The drawings referred to in this description should not be understood as being drawn to scale except if specifically noted.

DETAILED DESCRIPTION

Figure 1:
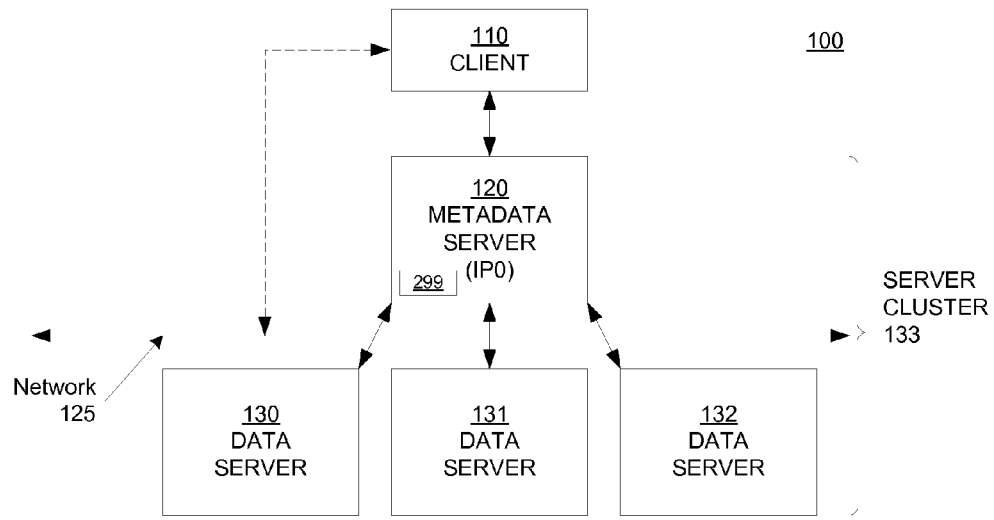
FIG. 1 is a block diagram depicting an example of a network upon which embodiments according to the present disclosure can be implemented.

Reference will now be made in detail to various embodiments in accordance with the invention, examples of which are illustrated in the accompanying drawings. While the invention will be described in conjunction with various embodiments, it will be understood that these various embodiments are not intended to limit the invention. On the contrary, the invention is intended to cover alternatives, modifications, and equivalents, which may be included within the scope of the invention as construed according to the appended Claims. Furthermore, in the following detailed description of various embodiments in accordance with the invention, numerous specific details are set forth in order to provide a thorough understanding of the invention. However, it will be evident to one of ordinary skill in the art that the invention may be practiced without these specific details. In other instances, well known methods, procedures, components, and circuits have not been described in detail as not to unnecessarily obscure aspects of the invention.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of operations or steps or instructions leading to a desired result. The operations or steps are those utilizing physical manipulations of physical quantities. Usually, although not necessarily, these quantities take the form of electrical or magnetic signals capable of being stored, transferred, combined, compared, and otherwise manipulated in a computer system or computing device. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "receiving," "deactivating," "disabling," "freezing," "re-activating," "enabling," "thawing," "sending," "determining," "flushing," "responding," "generating," "making," "blocking," "accessing," "taking a snapshot," "associating," "allowing," "updating," or the like, refer to actions and processes of a computer system or similar electronic computing device or processor. The computer system or similar electronic computing device manipulates and transforms data represented as physical (electronic) quantities within the computer system memories, registers or other such information storage, transmission or display devices.

It is appreciated present systems and methods can be implemented in a variety of architectures and configurations. For example, present systems and methods can be implemented as part of a distributed computing environment, a cloud computing environment, a client server environment, etc. Embodiments described herein may be discussed in the general context of computer-executable instructions residing on some form of computer-readable storage medium, such as program modules, executed by one or more computers, computing devices, or other devices. By way of example, and not limitation, computer-readable storage media may comprise computer storage media and communication media. Generally, program modules include routines, programs, objects, components, data structures, etc., that perform particular tasks or implement particular abstract data types. The functionality of the program modules may be combined or distributed as desired in various embodiments.

Computer storage media can include volatile and nonvolatile, removable and non-removable media implemented in any method or technology for storage of information such as computer-readable instructions, data structures, program modules, or other data. Computer storage media can include, but is not limited to, random access memory (RAM), read only memory (ROM), electrically erasable programmable ROM (EEPROM), flash memory, or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can be accessed to retrieve that information.

Communication media can embody computer-executable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media can include wired media such as a wired network or direct-wired connection, and wireless media such as acoustic, radio frequency (RF), infrared and other wireless media. Combinations of any of the above can also be included within the scope of computer-readable storage media.

FIG. 1 is a block diagram depicting a network 100 upon which embodiments of the present disclosure may be used. The network 100 may be referred to as, but is not limited to, a clustered storage system, cluster file system, network file system, or storage area network. In general, the network 100 is a network in which a set of computers (e.g., similar to computer system 210 of FIG. 3) can perform input/output (I/O) operations using, in one embodiment, an object-based file system that utilizes Internet Protocol (IP)-based storage and remote procedure calls (RPCs), but is not limited to such.

In the example of FIG. 1, the network 100 can include a meta-data server 120 (which may be referred to herein as a "server node") and data servers 130, 131, and 132. Furthermore, the network 100 can include a server cluster 133, which can include the meta-data server 120 and the data servers 130-132. The data servers 130-132 may be referred to as Object Storage Devices (OSDs). The meta-data server 120 and the data servers 130-132 can communicate with each other via a communication network 125. It is noted that the communication network 125 can be implemented in a wide variety of ways. For example, the communication network 125 can include, but is not limited to, one or more wired technology networks, one or more wireless technology networks, or any combination of wired and wireless technology networks. Within the network 100, note that there may be any number of meta-data servers (e.g., similar to meta-data server 120), any number of data servers (e.g., similar to data servers 130-132), and any number of clients (e.g., similar to client 110).

In an embodiment, a unique address can be associated with the meta-data server 120. In one embodiment, a server within the server cluster 133 may be designated as the access point through which communications between clients (e.g., 110) and the server cluster 133 are channeled. In an embodiment, the address is an IP address (e.g., IP0). A client 110 can be given an IP address, which it uses to contact the meta-data server (e.g., 120) to which it is assigned, either through the communication network 125 or more directly. In the example of FIG. 1, the IP address IP0 for meta-data server 120 can be provided to the client 110.

Within FIG. 1, it is noted that the meta-data server 120 can include a partition key module 299 in accordance with various embodiments of the present disclosure. For example in one embodiment, the partition key module 299 can cause the meta-data server 120 to implement a temporary partition key "freeze" or deactivation operation prior to a snapshot being taken of one or more Object Storage Device (OSD) partitions of the network 100. Additionally, in an embodiment, the module 299 can cause the meta-data server 120 to implement a partition key "thaw" or re-activation operation subsequent to the snapshot being taken of one or more Object Storage Device partitions of the network 100. Moreover, in one embodiment, the partition key module 299 can cause the meta-data server 120 to implement a snapshot operation within the network 100 that includes a temporary partition key freeze or deactivation operation and a partition key thaw or re-activation operation.

It is noted that the client 110 can access data stored in the data servers 130-132 via the meta-data server 120. Information about the data (e.g., meta-data) can be stored on or by the meta-data server 120. The meta-data server 120 can perform operations such as, but not limited to, looking up pathnames, retrieving file sizes, tracking access/update times, and checking permissions. Meta-data server 120 is, in general, a computer that runs server software that performs the above operations and that also can pass out or issue tokens (or capabilities) that allow access to the objects on the data servers 130-132 that contain file data. In addition, each token (or capability) can be signed by a partition key, which corresponds to one or more partitions on the data servers 130-132.

In the example of FIG. 1, note that the data requested by the client 110 may span multiple objects and may be distributed across one or more of the data servers 130-132. In addition, the data may also be stored redundantly across multiple objects on one or more of the data servers 130-132.

In accordance with one embodiment, the meta-data server 120 and the data servers 130-132 can present a full file system abstraction to the client 110. In other words, the architecture of the network 100 is, in general, transparent to the client 110.

Figure 2:
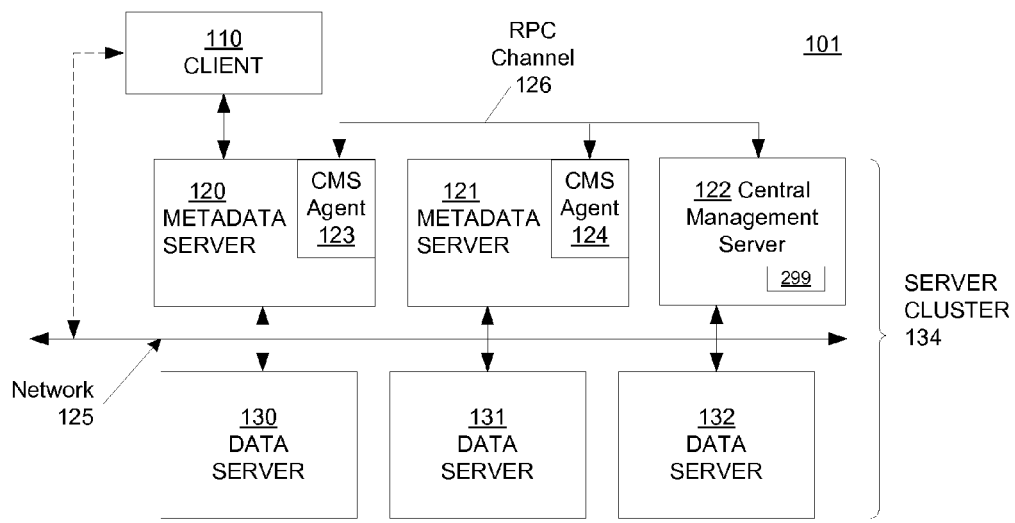
FIG. 2 is a block diagram depicting an example of a network including a central management server according to an embodiment of the present disclosure.

FIG. 2 is a block diagram depicting an example of a network 101 including a central management server (CMS) 122 according to an embodiment of the present disclosure. Network 101 of FIG. 2 can operate in a manner similar to network 100 of FIG. 1. However, it is noted that network 101 of FIG. 2 can be utilized to implement a snapshot operation across multiple meta-data servers in accordance with various embodiments. Note that in one embodiment, the central management server 122 can also serve as a meta-data server similar to the meta-data server 120. In addition, the role of the central management server 122 can be handled by a server other than a meta-data server.

Network 101 can include, but is not limited to, the meta-data servers 120 and 121, the central management server 122, and the data servers 130, 131, and 132. Furthermore, the network 101 can include a server cluster 134, which can include the meta-data servers 120 and 121, the central management server 122, and the data servers 130-132. Note that a central management server (CMS) agent or daemon can reside on each of the meta-data servers 120 and 121 of the network 101. Specifically, a CMS agent or daemon 123 can reside on the meta-data server 120 and a CMS agent or daemon 124 can reside on the meta-data server 121. The meta-data servers 120 and 121, the central management server 122, and the data servers 130-132 can communicate with each other via the communication network 125. Additionally, in an embodiment, another communication mechanism between the central management server 122 and the meta-data servers 120 and 121 can be a remote procedure call (RPC) channel 126. Specifically, the RPC channel 126 can exist between the central management server 122 and the CMS agent 123 of the meta-data server 120 and the CMS agent 124 of the meta-data server 121.

Within FIG. 2, it is noted that the central management server 122 can include a partition key module 299 in accordance with various embodiments of the present disclosure. For example in one embodiment, the partition key module 299 can cause the central management server 122 to implement across meta-data servers a temporary partition key "freeze" or deactivation operation preceding a snapshot being taken of one or more Object Storage Device partitions of the network 101. In addition, in an embodiment, the module 299 can cause the central management server 122 to implement a partition key "thaw" or re-activation operation following the snapshot being taken of one or more Object Storage Device partitions of the network 101. Furthermore, in one embodiment, the partition key module 299 can cause the central management server 122 to implement a snapshot operation across multiple meta-data servers (e.g., the meta-data servers 120 and 121) that includes a temporary partition key freeze or deactivation operation and a partition key thaw or re-activation operation.

Figure 3:
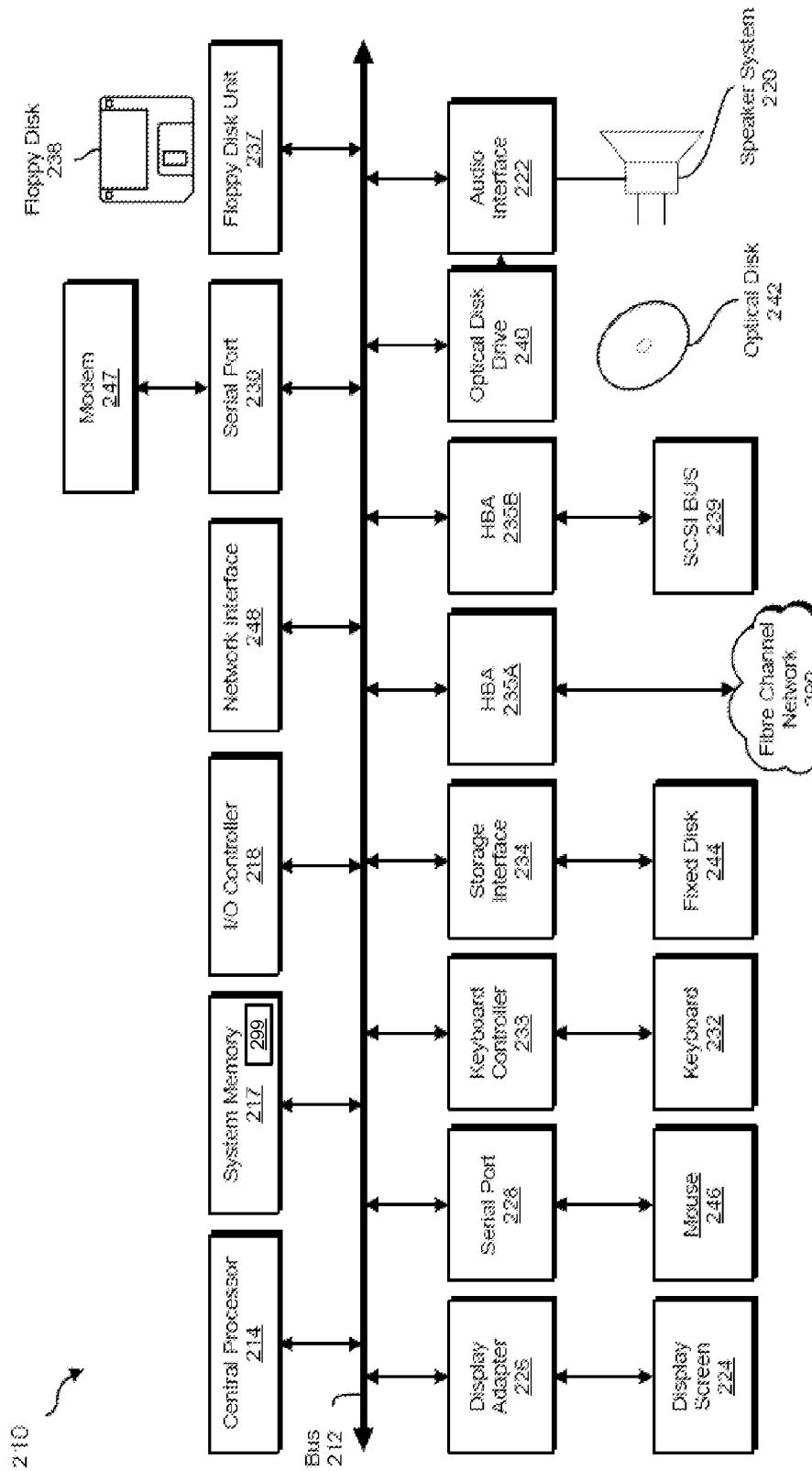
FIG. 3 is a block diagram depicting an example of a computer system upon which embodiments according to the present disclosure can be implemented.

FIG. 3 depicts a block diagram of a computer system 210 suitable for implementing embodiments of the present disclosure. In the discussion to follow, various and numerous components and elements are described. Various combinations and subsets of those components can be used to implement the devices mentioned in conjunction with FIGS. 1 and 2. For example, the client 110 may be a full-function computer system that employs many if not all of the features of the computer system 210. However, the meta-data servers 120-121, the central management server 122, and the data servers 130-132 may utilize a subset of those features needed to support the functionality provided by those devices. For example, the meta-data servers 120-121, the central management server 122, and the data servers 130-132 may not need a keyboard or display, and may execute a relatively sparse operating system that supports the functionality of data storage and data access and the management of such functionality.

In the example of FIG. 3, the computer system 210 includes a bus 212 which interconnects major subsystems of the computer system 210. These subsystems can include, but is not limited to, one or more central processors 214; a system memory 217; an input/output controller 218; an external audio device, such as a speaker system 220 via an audio output interface 222; an external device, such as a display screen 224 via display adapter 226; serial ports 228 and 230; a keyboard 232 (interfaced with a keyboard controller 233); a storage interface 234; a floppy disk drive 237 operative to receive a floppy disk 238; a host bus adapter (HBA) interface card 235A operative to connect with a Fibre Channel network 290; an HBA interface card 235B operative to connect to a Small Computer System Interface (SCSI) bus 239; and an optical disk drive 240 operative to receive an optical disk 242. Also included are a mouse 246 (or other point-and-click device, coupled to bus 212 via serial port 228); a modem 247 (coupled to bus 212 via serial port 230); and a network interface 248 (coupled directly to bus 212). The modem 247, network interface 248 or some other method can be used to provide connectivity from each of the nodes 110 and 120 to the network 100 of FIG. 1.

The bus 212 of FIG. 3 allows data communication between the central processor 214 and system memory 217, which may include non-volatile memory (e.g., read only memory (ROM), programmable ROM, flash memory, electrically erasable programmable read only memory (EEPROM), and the like) or volatile memory (e.g., random access memory (RAM), static RAM, dynamic RAM, and the like) or some combination of non-volatile memory and volatile memory. The volatile memory is generally the main memory into which the operating system and application programs are loaded. The non-volatile memory can contain, among other code, the Basic Input-Output System (BIOS) which controls basic hardware operation such as the interaction with peripheral components.

Applications resident within the computer system 210 are generally stored on and accessed via a computer-readable storage medium, such as a hard disk drive (e.g., the fixed disk 244), an optical drive (e.g., the optical drive 240), a floppy disk unit 237, or other storage medium. Applications can be in the form of electronic signals modulated in accordance with the application and data communication technology when accessed via network modem 247 or interface 248.

Continuing with reference to FIG. 3, storage interface 234, as with the other storage interfaces of computer system 210, can connect to a standard computer-readable storage medium for storage and/or retrieval of information, such as a fixed disk drive 244. The fixed disk drive 244 may be a part of the computer system 210, or it may be separate and accessed through other interface systems. The modem 247 may provide a direct connection to a remote server via a telephone link or to the Internet via an internet service provider (ISP). The network interface 248 may provide a direct connection to a remote server via a direct network link to the Internet via a POP (point of presence). The network interface 248 may provide such a connection using wireless techniques, including digital cellular telephone connection, Cellular Digital Packet Data (CDPD) connection, digital satellite data connection, or the like.

Many other devices or subsystems (not shown in FIG. 3) may be connected to the computer system 210 in a similar manner (e.g., document scanners, digital cameras, and the like). Conversely, all of the devices shown in FIG. 3 need not be present to practice the present disclosure. In addition, it is noted that the devices and subsystems of the computer system 210 can be interconnected in different ways from that shown in FIG. 3.

The operation of a computer system such as that shown in FIG. 3 is readily known in the art and is not discussed in detail in this application. The operating system provided on the computer system 210 may be MS-DOS®, MS-WINDOWS®, OS/2®, UNIX®, Linux®, or another known operating system. Code to implement various embodiments of the present disclosure can be stored in computer-readable storage media such as one or more of the system memory 217, fixed disk 244, optical disk 242, or floppy disk 238. For example, the system memory 217 is shown storing a partition key module 299 in accordance with various embodiments of the present disclosure. However, the partition key module 299 can also be stored in computer-readable storage media such as one or more of the system memory 217, fixed disk 244, optical disk 242, or floppy disk 238.

In the example of FIG. 3, it is noted that the partition key module 299 can cause the computer system 210 to implement a temporary partition key freeze or deactivation operation before a snapshot is taken of one or more Object Storage Device partitions of a network (e.g., the network 100 or the network 101). Furthermore, in an embodiment, the module 299 can cause the computer system 210 to implement a partition key thaw or re-activation operation after the snapshot is taken of one or more Object Storage Device partitions of a network (e.g., the network 100 or the network 101). Additionally, in one embodiment, the partition key module 299 can cause the computer system 210 to implement a snapshot operation within a network (e.g., the network 100 or the network 101) that includes a temporary partition key freeze or deactivation operation and a partition key thaw or re-activation operation. It should further be noted, that in an embodiment, the computer system 210 can have some, most, or all of its functionality supplanted by a distributed computer system having a large number of dispersed computing nodes, as would be the case where the functionality of the computer system 210 is partly or wholly executed using a cloud computing environment.

Regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present disclosure may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

In accordance with an embodiment of the present disclosure, there are two operations: key partition freeze (or temporarily deactivating a partition key) and key partition thaw (or re-activating the partition key). For example in one embodiment, whenever a partition key is frozen or temporarily deactivated, an object storage device does not reject a token or capability from a client, but instead asks or requests that the client retry the operation. In addition, whenever the frozen partition key is thawed or re-activated, the clients of the object storage device can continue to access the object storage device with their old tokens or capabilities. It is noted that the key partition freeze (or temporary partition key deactivation) operation and the key partition thaw (or partition key re-activation) operation can be used to freeze (or deactivate) and thaw (or re-activate) access to object storage device partitions during a snapshot creation, but is not limited to such.

In one embodiment, a snapshot image can be a system call consistent copy of a source file system or it can be a crash consistent copy. For example, given that there are three write calls W1, W2, and W3, to different files on a file system. Furthermore, W1, W2, and W3 is the time order of these write calls. If a snapshot is taken after W2 but before W3 then: a system call consistent snapshot will have W1 and W2 and will not have W3. However, a crash consistent snapshot will not have W3 and may or may not have either or both of W1 and W2. It is noted that this means the crash consistent snapshot can have W2 and not have W1 which occurred before W2. System call consistent snapshots have the advantage that they provide an image which existed at some point in time. Whereas a crash consistent snapshot can give or produce an image which never existed, though it is consistent from the point of view of file system meta-data.

Figure 4:
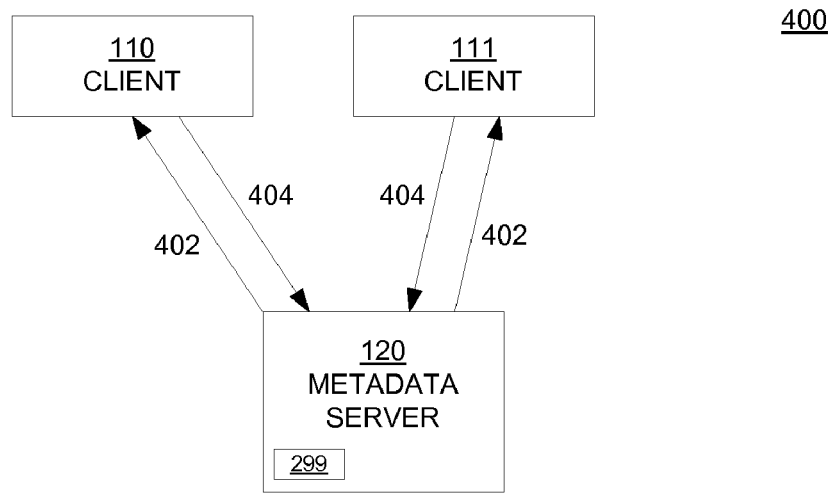
FIG. 4 is a block diagram depicting an example of a flush dirty state process in accordance with one embodiment.

FIG. 4 is a block diagram depicting an example of a flush dirty state operation or method 400 in accordance with one embodiment. The flush dirty state process 400 can include, but is not limited to, clients 110 and 111 along with the metadata server 120. It is noted that the client 111 can be implemented in any manner similar to the client 110, as described herein. It is pointed out that in an embodiment, the flush dirty state process 400 can be a beginning process of a snapshot operation of one or more partitions of the data servers 130-132.

In preparation for a snapshot operation, the meta-data server 120 can send out or transmit a flush message 402 to the clients 110 and 111. Note that the flush message 402 instructs the receiving clients 110 and 111 to flush their dirty state (or data) and also instructs the clients 110 and 111 to not create any more dirty states (or data).

Within FIG. 4, upon reception of the message 402, the clients 110 and 111 can each perform the instructed operations. Once completed, each of the clients 110 and 111 can send or transmit an acknowledge message 404 back to the meta-data server 120 indicating reception of the flush message 402 and that its associated instructions have been completed. In this manner, the dirty states or data of the clients 110 and 111 can be flushed in preparation for the snapshot operation of one or more partitions of the data servers 130-132.

Figure 5:
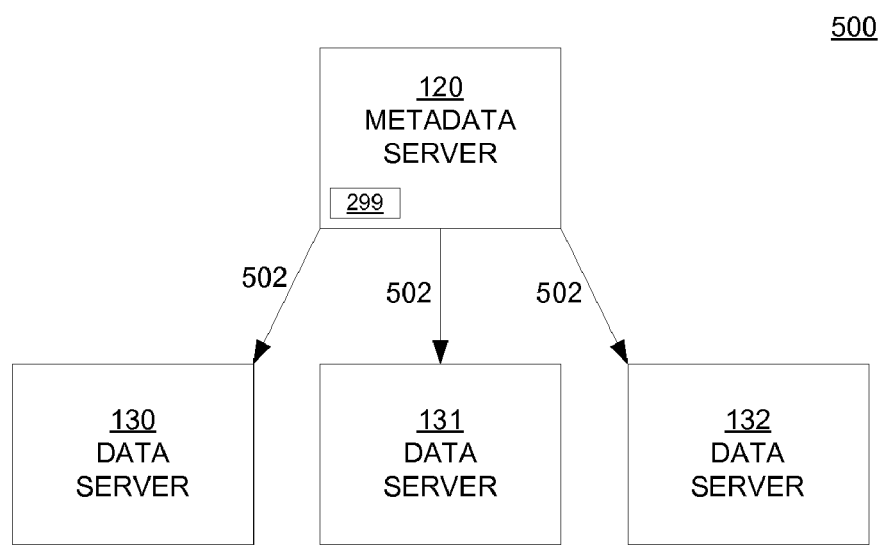
FIG. 5 is a block diagram depicting an example of a "freeze" operation in accordance with an embodiment.

FIG. 5 is a block diagram depicting an example of a "freeze" or temporary deactivation operation or method 500 in accordance with an embodiment. The "freeze" or temporary deactivation operation 500 can include, but is not limited to, the metadata server 120 and the data servers 130-132. It is noted that in an embodiment, the "freeze" or temporary deactivation operation 500 can be a preceding process to a snapshot operation of one or more partitions of the data servers 130-132.

In preparation for a snapshot operation in one embodiment, the meta-data server 120 can send out or transmit a freeze message 502 to each of the data servers 130-132. It is noted that the freeze message 502 instructs the receiving data servers 130-132 to block the clients (e.g., 110 and 111) from accessing one or more specific partitions of the data servers 130-132. In an embodiment, the freeze message 502 can specifically instruct the receiving data servers 130-132 to temporarily deactivate (or disable or "freeze") the one or more partition keys associated with the recited one or more recited partitions of the data servers 130-132.

Within FIG. 5, upon reception of the freeze message 502, the data servers 130-132 can each perform the temporary deactivation (or disablement or "freeze") of the one or more partition keys. It is noted that once the one or more partition keys are temporarily deactivated (or disabled or "frozen"), each of the data servers 130-132 will not allow the clients 110 and 111 to access the specified partitions.

For example, if the client 110 presents a security token (or capability) to the data server 130 in order to access or store file data within one or more partitions, the data server 130 can determine whether the security token is signed by a partition key that is temporarily deactivated (or disabled or "frozen"). If the data server 130 determines that the partition key is temporarily deactivated, the data server 130 transmits a message or code to the client 110. In one embodiment, the transmitted message or code can inform the client 110 that the partition key is temporarily deactivated (or disabled or "frozen") and can instruct the client 110 to re-submit or retry the security token after the elapse of a defined period of time (e.g., 30 seconds, 1 minute, or any amount of time). However, if the data server 130 determines that the partition key is active and not temporarily deactivated, the data server 130 enables the client 110 to access or store file data within the desired one or more partitions. In this fashion, one or more partition keys of the data servers 130-132 can be "frozen" or temporary deactivation in accordance with one embodiment.

Figure 6:
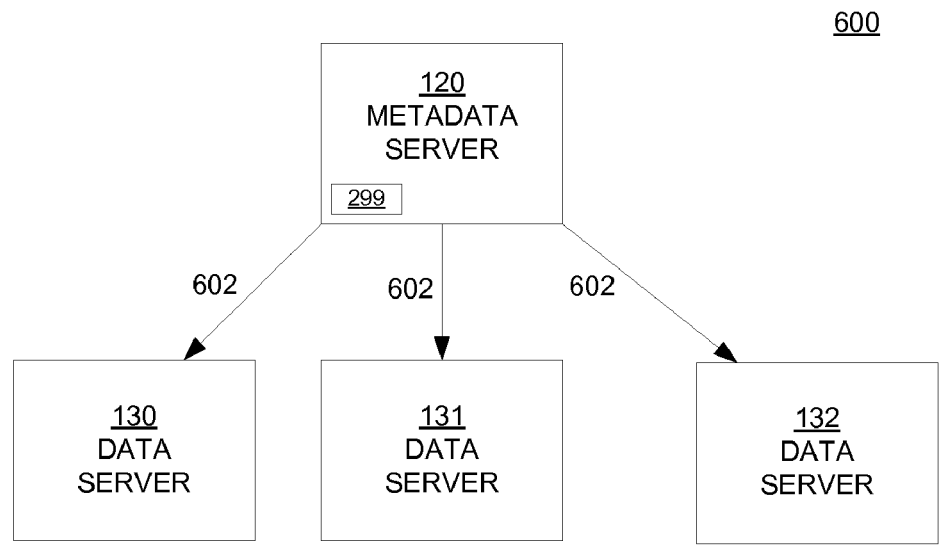
FIG. 6 is a block diagram depicting an example of a "thaw" operation in accordance with one embodiment.

FIG. 6 is a block diagram depicting an example of a "thaw" operation or method 600 in accordance with one embodiment. The "thaw" or re-activation operation 600 can include, but is not limited to, the metadata server 120 and the data servers 130-132. It is pointed out that in an embodiment, the "thaw" or re-activation operation 600 can be a subsequent process to a snapshot operation of one or more partitions of the data servers 130-132.

Once a snapshot operation has been completed in one embodiment, the meta-data server 120 can send out or transmit a thaw message 602 to each of the data servers 130-132. It is noted that the thaw message 602 can instruct the receiving data servers 130-132 to allow the clients (e.g., 110 and 111) to access one or more specific partitions of the data servers 130-132. In accordance with one embodiment, the thaw message 602 can specifically instruct the receiving data servers 130-132 to re-activate (or enable or "thaw") one or more partition keys associated with the one or more recited partitions of the data servers 130-132 that were beforehand temporarily deactivated (or disabled or "frozen").

Within FIG. 6, upon reception of the thaw message 602, the data servers 130-132 can each perform the re-activation (or enablement or "thawing") of the one or more partition keys. It is pointed out that once the one or more partition keys are re-activated (or enabled or "thawed"), each of the data servers 130-132 will allow the clients 110 and 111 to access the specified partitions.

For example, if the client 111 presents a security token (or capability) to the data server 132 in order to access or store file data within one or more partitions, the data server 132 can determine if the security token is signed by a partition key that is activated (or has been re-activated or enabled or "thawed"). If the data server 132 determines that the partition key is currently activated (or has been re-activated or enabled or "thawed"), the data server 132 enables the client 110 to access or store file data within the desired one or more partitions. In this manner, one or more partition keys of the data servers 130-132 can be re-activated (or enabled or "thawed") in accordance with one embodiment.

Figure 7:
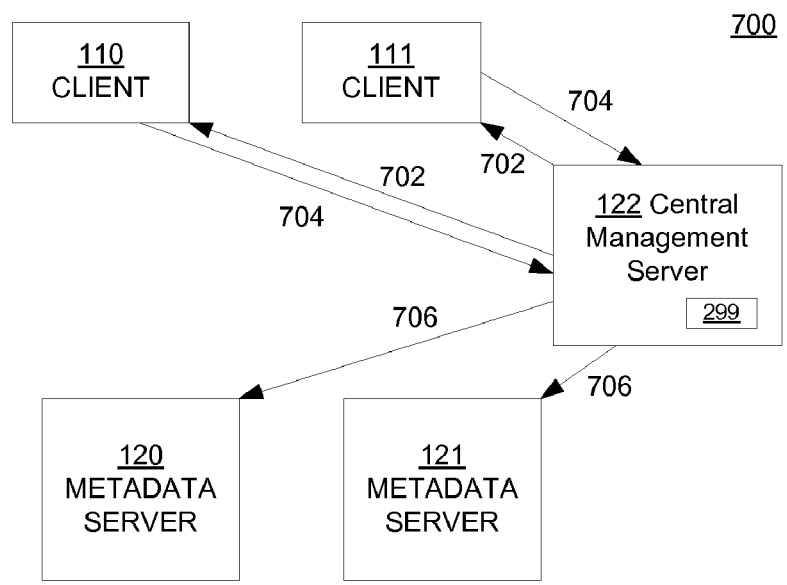
FIG. 7 is a block diagram depicting an example of a flush dirty state process involving a central management server in accordance with an embodiment.

FIG. 7 is a block diagram depicting an example of a flush dirty state process or method 700 involving a central management server in accordance with an embodiment. The flush dirty state process 700 can include, but is not limited to, clients 110 and 111, the metadata servers 120 and 121, and the central management server 122. Note that the client 111 can be implemented in any manner similar to the client 110, as described herein. It is noted that in an embodiment, the flush dirty state process 700 can be a beginning process of a snapshot operation of one or more partitions of the data servers 130-132 (not shown).

In preparation for a snapshot operation, the central management server 122 can send out or transmit a flush message 702 to the clients 110 and 111. It is pointed out that the flush message 702 instructs the receiving clients 110 and 111 to flush their dirty state (or data) and also instructs the clients 110 and 111 to not create any more dirty states (or data).

Within FIG. 7, upon reception of the message 702, the clients 110 and 111 can each perform the instructed operations. Once completed, each of the clients 110 and 111 can send or transmit an acknowledge message 704 back to the central management server 122 indicating reception of the flush message 702 and that its associated instructions have been completed.

Additionally, in preparation for the snapshot operation, the central management server 122 can send out or transmit a flush message 706 to the meta-data servers 120 and 121. It is noted that the flush message 706 can instruct the receiving meta-data servers 120 and 121 to flush their dirty state (or data) and to stop issuing any new tokens to clients for accessing objects. Upon reception of the message 706, the meta-data servers 120 and 121 can each perform the instructed operations. In this manner, the dirty states or data of the clients 110 and 111 and the meta-data servers 120 and 121 can be flushed in preparation for the snapshot operation of one or more partitions of the data servers 130-132.

Figure 8:
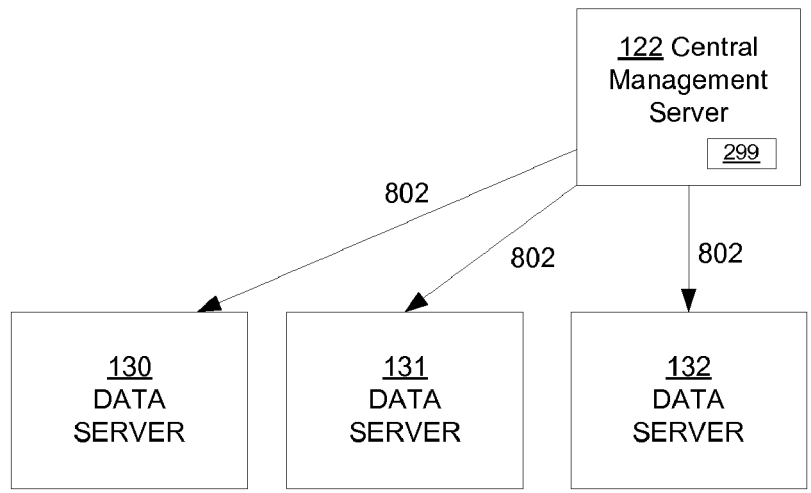
FIG. 8 is a block diagram depicting an example of a "freeze" operation involving a central management server in accordance with one embodiment.

FIG. 8 is a block diagram depicting an example of a "freeze" operation or method 800 involving a central management server in accordance with one embodiment. Specifically, the "freeze" or temporary deactivation operation 800 can include, but is not limited to, the central management server 122 and the data servers 130-132. It is pointed out that in an embodiment, the "freeze" or temporary deactivation operation 800 can be a preceding process to a snapshot operation of one or more partitions of the data servers 130-132.

In preparation for a snapshot operation in one embodiment, the central management server 122 can send out or transmit a freeze message 802 to each of the data servers 130-132. Note that the freeze message 802 instructs the receiving data servers 130-132 to block the clients (e.g., 110 and 111) from accessing one or more specific partitions of the data servers 130-132. In accordance with an embodiment, the freeze message 802 can specifically instruct the receiving data servers 130-132 to temporarily deactivate (or disable or "freeze") the one or more partition keys associated with the one or more recited partitions of the data servers 130-132.

Within FIG. 8, upon reception of the freeze message 802, the data servers 130-132 can each perform the temporary deactivation (or disablement or "freeze") of the one or more partition keys. It is pointed out that once the one or more partition keys are temporarily deactivated (or disabled or "frozen"), each of the data servers 130-132 will not allow the clients 110 and 111 to access the specified partitions.

For example, if the client 111 presents a security token (or capability) to the data server 131 to access or store file data within one or more partitions, the data server 131 can determine whether the security token is signed by a partition key that is temporarily deactivated (or disabled or "frozen"). If the data server 131 determines that the partition key is temporarily deactivated, the data server 131 transmits a message or code to the client 111. In one embodiment, the transmitted message or code can inform the client 111 that the partition key is temporarily deactivated (or disabled or "frozen") and can instruct the client 111 to re-submit or retry the security token after the passing of a defined period of time (e.g., 15 seconds, 45 seconds, or any amount of time). However, if the data server 131 determines that the partition key is active and not temporarily deactivated, the data server 131 enables the client 111 to access or store file data within the desired one or more partitions. In this manner, one or more partition keys of the data servers 130-132 can be "frozen" or temporary deactivation in accordance with an embodiment.

Figure 9:
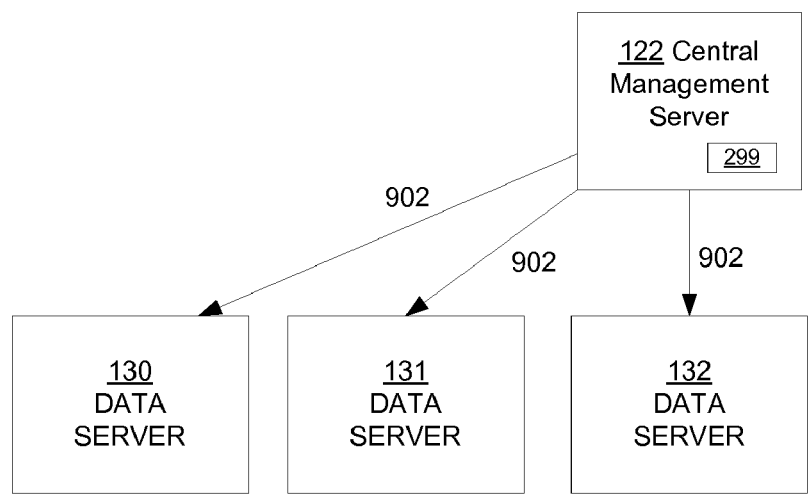
FIG. 9 is a block diagram depicting an example of a "thaw" operation involving a central management server in accordance with an embodiment.

FIG. 9 is a block diagram depicting an example of a "thaw" operation or method 900 involving a central management server in accordance with an embodiment. The "thaw" or re-activation operation 900 can include, but is not limited to, the central management server 122 and the data servers 130-132. It is noted that in one embodiment, the "thaw" or re-activation operation 900 can be a subsequent process to a snapshot operation of one or more partitions of the data servers 130-132.

Once a snapshot operation has been completed in an embodiment, the central management server 122 can send out or transmit a thaw message 902 to each of the data servers 130-132. Note that the thaw message 902 can instruct the receiving data servers 130-132 to allow the clients (e.g., 110 and 111) to access one or more specific partitions of the data servers 130-132. In one embodiment, the thaw message 902 can specifically instruct the receiving data servers 130-132 to re-activate (or enable or "thaw") one or more partition keys associated with the one or more recited partitions of the data servers 130-132 that were beforehand temporarily deactivated (or disabled or "frozen").

Within FIG. 9, upon reception of the thaw message 902, the data servers 130-132 can each perform the re-activation (or enablement or "thawing") of the one or more partition keys. Once the one or more partition keys are re-activated (or enabled or "thawed"), each of the data servers 130-132 will allow the clients 110 and 111 to access the specified partitions.

For example, if the client 110 presents a security token (or capability) to the data server 132 in order to access or store file data within one or more partitions, the data server 132 determines whether the security token is signed by a partition key that is activated (or has been re-activated or enabled or "thawed"). If the data server 132 determines that the partition key is activated (or has been re-activated or enabled or "thawed"), the data server 132 enables the client 110 to access or store file data within the desired one or more partitions. In this fashion, one or more partition keys of the data servers 130-132 can be re-activated (or enabled or "thawed") in accordance with one embodiment.

Figure 10:
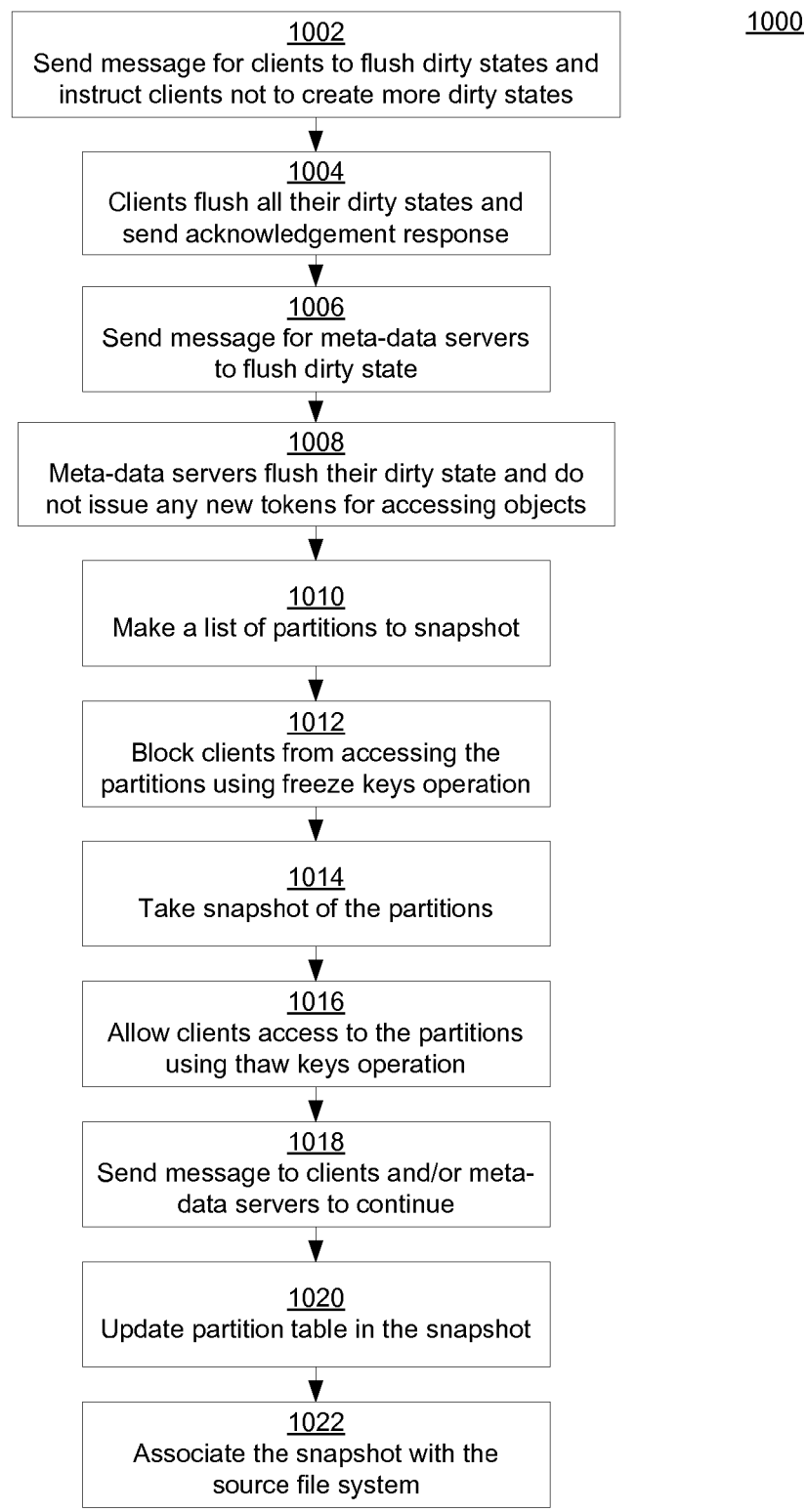
FIG. 10 is a flow diagram of a method in accordance with various embodiments of the present disclosure.

FIG. 10 is a flow diagram of an example method 1000 in accordance with various embodiments of the present disclosure for creating a system call consistent snapshot. Although specific operations are disclosed in flow diagram 1000, such operations are examples. Method 1000 may not include all of the operations illustrated by FIG. 10. Also, method 1000 may include various other operations and/or variations of the operations shown by FIG. 10. Likewise, the sequence of the operations of flow diagram 1000 can be modified. It is appreciated that not all of the operations in flow diagram 1000 may be performed. In various embodiments, one or more of the operations of method 1000 can be controlled or managed by software, by firmware, by hardware or by any combination thereof, but is not limited to such. Method 1000 can include processes of embodiments which can be controlled or managed by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

Specifically, method 1000 can include sending a message to one or more clients to flush dirty states or data and the message can instruct the one or more clients not to create more dirty states or data. After receiving the message, the one or more clients can flush all their dirty states or data and send an acknowledgement response. A message can be sent to one or more meta-data servers to flush their dirty states or data. After receiving the message, the one or more meta-data servers can flush their dirty states or data and do not issue any new tokens to clients for accessing objects of one or more data servers. In addition, a list can be made of one or more partitions to snapshot. Using freeze keys operation, clients are blocked from accessing the partitions on the list. One or more snapshots can be taken of the partitions. Using thaw keys operation, clients are allowed to access the partitions. A message can be sent to clients and/or meta-data servers to continue normal operation. The partition table can be updated in the snapshot. The snapshot can be associated with the source file system.

At operation 1002 of FIG. 10, a message (e.g., 402 or 702) can be sent to one or more clients (e.g., 110 and/or 111) to flush dirty states or data and the message can instruct the one or more clients not to create more dirty states or data. It is pointed out that operation 1002 can be implemented in a wide variety of ways. For example, operation 1002 can be implemented in any manner similar to that described herein, but is not limited to such.

At operation 1004, after receiving the message, the one or more clients can flush all their dirty states or data and send an acknowledgement response (e.g., 404 or 704). It is noted that operation 1004 can be implemented in a wide variety of ways. For example, operation 1004 can be implemented in any manner similar to that described herein, but is not limited to such.

At operation 1006 of FIG. 10, a message (e.g., 706) can be sent to one or more meta-data servers (e.g., 120 and/or 121) to flush their dirty states or data. Note that operation 1006 can be implemented in a wide variety of ways. For example, operation 1006 can be implemented in any manner similar to that described herein, but is not limited to such.

At operation 1008, after receiving the message, the one or more meta-data servers can flush their dirty states or data and do not issue any new tokens to clients for accessing objects of one or more data servers (e.g., 130, 131, and/or 132). It is pointed out that operation 1008 can be implemented in a wide variety of ways. For example, operation 1008 can be implemented in any manner similar to that described herein, but is not limited to such.

At operation 1010 of FIG. 10, a list can be made of one or more partitions to snapshot. It is noted that operation 1010 can be implemented in a wide variety of ways. For example in one embodiment, a meta-data server (e.g., 120) can make a list of one or more partitions to snapshot at operation 1010. In an embodiment, a central management server (e.g., 122) can make a list of one or more partitions to snapshot at operation 1010. Note that operation 1010 can be implemented in any manner similar to that described herein, but is not limited to such.

At operation 1012, using a freeze keys operation or method (e.g., 500 or 800), clients are blocked from accessing the partitions on the list. Note that operation 1012 can be implemented in a wide variety of ways. For example in one embodiment, the freeze keys operation or method can include freezing or temporarily deactivate a policy access tag (PAT) of an object. It is pointed out that operation 1012 can be implemented in any manner similar to that described herein, but is not limited to such.

At operation 1014 of FIG. 10, one or more snapshots can be taken of the partitions on the list. It is noted that operation 1014 can be implemented in a wide variety of ways. For example, operation 1014 can be implemented in any manner similar to that described herein, but is not limited to such.

At operation 1016, using a thaw keys operation or method (e.g., 600 or 900), clients are allowed to access the partitions on the list. It is pointed out that operation 1016 can be implemented in a wide variety of ways. For example, operation 1016 can be implemented in any manner similar to that described herein, but is not limited to such.

At operation 1018 of FIG. 10, a message can be sent to clients and/or meta-data servers to continue normal operation. Note that operation 1018 can be implemented in a wide variety of ways. For example, operation 1018 can be implemented in any manner similar to that described herein, but is not limited to such.

At operation 1020, the partition table can be updated in the one or more snapshots. Note that operation 1020 can be implemented in a wide variety of ways. For example, operation 1020 can be implemented in any manner similar to that described herein, but is not limited to such.

At operation 1022 of FIG. 10, the snapshot can be associated with the source file system. It is noted that operation 1022 can be implemented in a wide variety of ways. For example, operation 1022 can be implemented in any manner similar to that described herein, but is not limited to such. Once operation 1022 is completed, process 1000 can be ended or exited. In this manner, a system call consistent snapshot can be created in accordance with various embodiments of the present disclosure.

Figure 11:
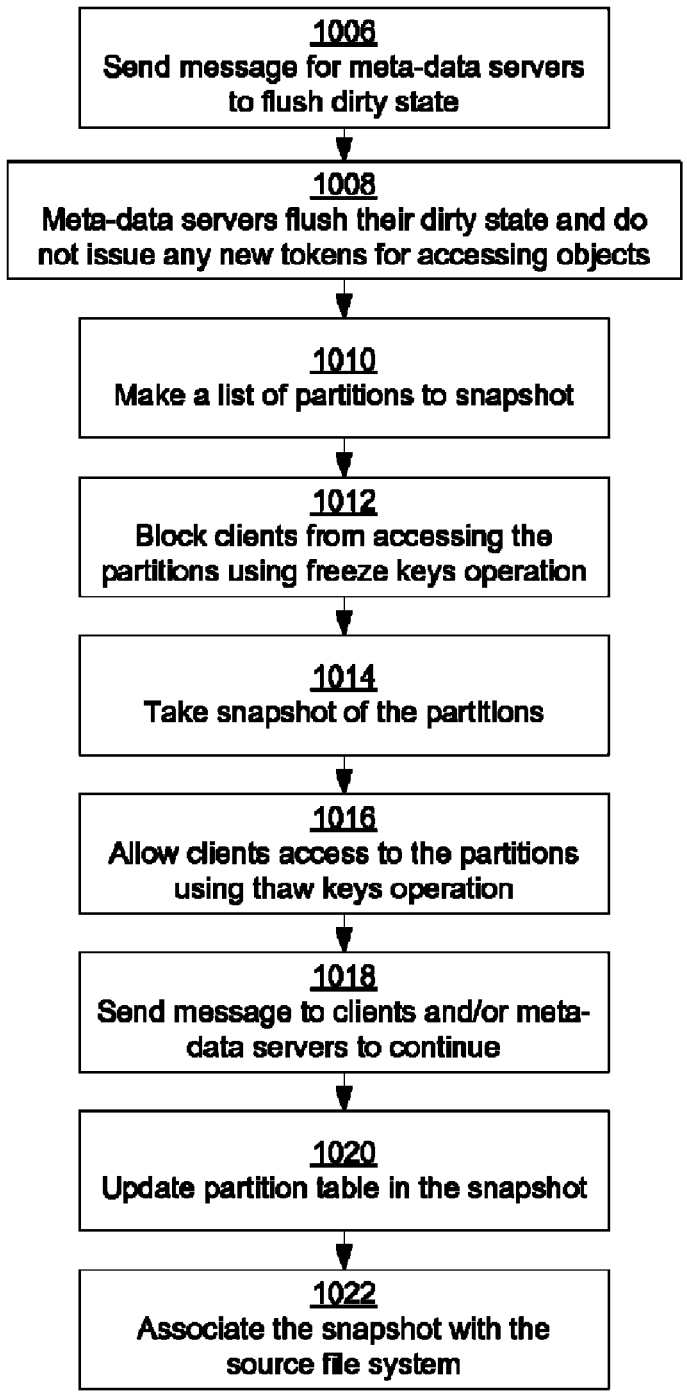
FIG. 11 is a flow diagram of another method in accordance with various embodiments of the present disclosure.

FIG. 11 is a flow diagram of an example method 1100 in accordance with various embodiments of the present disclosure for creating a crash consistent snapshot. Although specific operations are disclosed in flow diagram 1100, such operations are examples. Method 1100 may not include all of the operations illustrated by FIG. 11. Also, method 1100 may include various other operations and/or variations of the operations shown by FIG. 11. Likewise, the sequence of the operations of flow diagram 1100 can be modified. It is appreciated that not all of the operations in flow diagram 1100 may be performed. In various embodiments, one or more of the operations of method 1100 can be controlled or managed by software, by firmware, by hardware or by any combination thereof, but is not limited to such. Method 1100 can include processes of embodiments which can be controlled or managed by a processor(s) and electrical components under the control of computer or computing device readable and executable instructions (or code). The computer or computing device readable and executable instructions (or code) may reside, for example, in data storage features such as computer or computing device usable volatile memory, computer or computing device usable non-volatile memory, and/or computer or computing device usable mass data storage. However, the computer or computing device readable and executable instructions (or code) may reside in any type of computer or computing device readable medium.

Specifically, method 1100 can include sending a message to one or more meta-data servers to flush their dirty states or data. After receiving the message, the one or more meta-data servers can flush their dirty states or data and do not issue any new tokens to clients for accessing objects of one or more data servers. Additionally, a list can be made of one or more partitions to snapshot. Using freeze keys operation, clients are blocked from accessing the partitions on the list. One or more snapshots can be taken of the partitions. Using thaw keys operation, clients are allowed to access the partitions. A message can be sent to clients and/or meta-data servers to continue normal operation. The partition table can be updated in the snapshot. The snapshot can be associated with the source file system.

It is noted that operations 1006, 1008, 1010, 1012, 1014, 1016, 1018, 1020, and 1022 of FIG. 11 can be implemented in any manner similar to operations 1006, 1008, 1010, 1012, 1014, 1016, 1018, 1020, and 1022 of FIG. 10 described herein, but is not limited to such.

Figure 12:
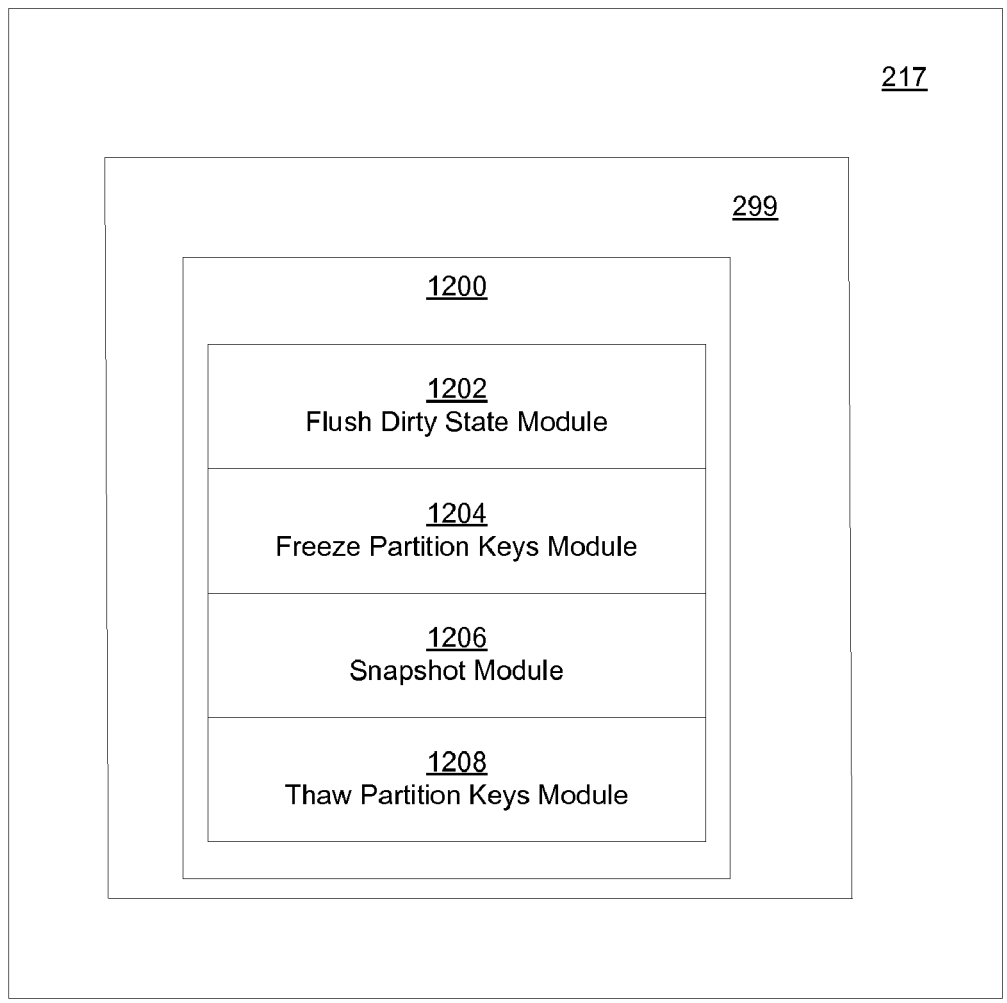
FIG. 12 is a block diagram of modules in accordance with various embodiments of the present disclosure.

FIG. 12 is a block diagram of an example module 1200 in accordance with one embodiment of the present disclosure. In an embodiment, the module 1200 can include instructions stored on a computer readable medium. In addition, the module 1200 can be part of the module 299 (described herein), which can be stored within the system memory 217, but is not limited to such. The module 1200 can include, but is not limited to, a flush dirty state (or data) module 1202, a freeze partition keys module 1204, a snapshot module 1206, and a thaw partition keys module 1208.

Specifically, the flush dirty state (or data) module 1202 can include instructions for performing a flush dirty state or data method (e.g., method 400, method 700, and the like). Additionally, the freeze partition keys module 1204 can include instructions for performing a freeze partition keys method (e.g., method 500, method 800, and the like). Furthermore, the snapshot module 1206 can include instructions for performing a snapshot method (e.g., method 1000, method 1100, and the like). Moreover, the thaw partition keys module 1208 can include instructions for performing a thaw partition keys method (e.g., method 600, method 900, and the like). It is appreciated that the flush dirty state (or data) module 1202, the freeze partition keys module 1204, the snapshot module 1206, and the thaw partition keys module 1208 can be implemented as part of a variety of environments. For example, the flush dirty state (or data) module 1202, the freeze partition keys module 1204, the snapshot module 1206, and the thaw partition keys module 1208 can be implemented as part of a distributed computing environment, a cloud computing environment, a client server environment, etc.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

What is claimed is:

1. A method comprising:
a server receiving a message to deactivate a partition key of an object based storage system, a token of the object based storage system is signed by the partition key, the object based storage system comprises the server; and
after receiving the message, the server deactivating the partition key to block access to a partition of the object based storage system by a client, the server comprises the partition.

2. The method of claim 1, further comprising:
re-activating the partition key to allow access to the partition of the object based storage system by the client.

3. The method of claim 1, further comprising:
the server receiving a message to re-activate the partition key; and
re-activating the partition key to allow access to the partition of the object based storage system by the client.

4. The method of claim 1, wherein the partition is an Object Storage Device partition.

5. The method of claim 1, further comprising:
after the deactivating, the server receiving the token and sending a message instructing to re-submit the token.

6. The method of claim 5, wherein the message sent by the server further instructing to re-submit the token after a defined period of time.

7. The method of claim 1, wherein the token is a security token.

8. A non-transitory computer readable storage medium having stored thereon, computer-executable instructions that when executed by a computing device cause the computing device to perform a method comprising:
receiving a message to deactivate a partition key of an object based storage system, a token of the object based storage system is signed by the partition key, the object based storage system comprises the computing device; and
after receiving the message, deactivating the partition key to block access to a partition of the object based storage system by a client, the computing device comprises the partition.

9. The non-transitory computer readable storage medium of claim 8, wherein the method further comprising:
re-activating the partition key to allow access to the partition of the object based storage system by the client.

10. The non-transitory computer readable storage medium of claim 8, wherein the method further comprising:
receiving a message to re-activate the partition key; and
re-activating the partition key to allow access to the partition of the object based storage system by the client.

11. The non-transitory computer readable storage medium of claim 8, wherein the partition is an Object Storage Device partition.

12. The non-transitory computer readable storage medium of claim 8, wherein the method further comprising:
after the deactivating, receiving the token and sending a message instructing to re-submit the token.

13. The non-transitory computer readable storage medium of claim 12, wherein the message instructing to re-submit the token further instructs to re-submit the token after a defined period of time.

14. The non-transitory computer readable storage medium of claim 8, wherein the token is a security token.

15. A computer system comprising:
a processor; and
computer readable storage media coupled to the processor and having stored therein instructions that, if executed by the computer system cause the computer system to execute a method comprising:

receiving a message to deactivate a partition key of an object based storage system, a token of the object based storage system is signed by the partition key, the object based storage system comprises the computing system; and after receiving the message, deactivating the partition key to block access to a partition of the object based storage system by a client, the computing system comprises the partition.

16. The computer system of claim 15, wherein the method further comprising:

re-activating the partition key to allow access to the partition of the object based storage system by the client.

17. The computer system of claim 15, wherein the method further comprising:

receiving a message to re-activate the partition key; and
re-activating the partition key to allow access to the partition of the object based storage system by the client.

18. The computer system of claim 15, wherein the partition is an Object Storage Device partition.

19. The computer system of claim 15, wherein the method further comprising:

after the deactivating, receiving the token and sending a message instructing to re-submit the token.

20. The computer system of claim 19, wherein the message instructing to re-submit the token further instructs to re-submit the token after a defined period of time.

* * * * *